Figure 1:
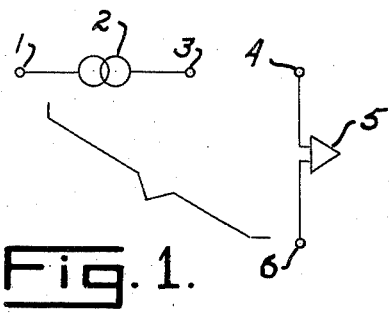

March 18, 1941.    S. BILINSKY    2,234,956

EXPLORATION WITH ELECTRIC IMPULSES

Filed Aug. 25, 1938

Inventor
SOLOMON BILINSKY
Jesse R. Stone
Lester B. Clark
By
Attorneys

Patented Mar. 18, 1941

2,234,956

UNITED STATES PATENT OFFICE 2,234,956

EXPLORATION WITH ELECTRIC IMPULSES

Solomon Bilinsky, Houston, Tex., assignor to E. E. Rosaire, Houston, Tex.

Application August 25, 1938, Serial No. 226,654

3 Claims. (Cl. 175—182)

This invention relates to electric prospecting with currents which vary with time.

Heretofore, electric transient prospecting as taught by Blau, 1,911,137, by West in application Serial No. 103,129, filed September 29, 1936, and others have been subject to the handicap that induction between conductors in the generating and detecting circuits accounted for a large part of the detected potential.

In the case where the current is caused to flow between two grounded electrodes through a wire connecting them and the potential in a region subject to such current flow is detected by two other grounded electrodes, with connecting wires of two components, one due to the current flowing in the ground which is useful in determining, for example, resistivity, and the other due to induction between the wires which, if appreciable, results in erroneous resistivity values for lengthy and difficult corrections such as offered by R. N. Foster in a paper entitled "Mutual impedance of grounded wires lying on the surface of the earth," Bell System Technical Journal, vol. 10, July 1931.

An object of this invention is to obviate the potential induced between wires.

A second object is to dispose the wires whereby the inductive effect between them is negligible.

Another object is to enable the use of alternating and impulse currents for geophysical determinations without the necessity of making elaborate corrections in the computations.

Still another object is to improve the technique in electrical transient prospecting wherein wave form changes used in drawing geological conclusions are made independent of the induction between wires leaving such changes subject solely to variations in stratigraphy and/or other geological changes.

It is also an object, when alternating current is used, to nullify the inductive effect between wires so that the results are not affected by frequency changes except insofar as the geological structures produce such effect.

With the foregoing objects as primary objects the invention comprehends means and method whereby these objects together with other objects, are realized as will be apparent from the following description taken in connection with the drawing in which:

Figs. 1 to 4 show plan views of some of the possible configurations in the practice of this invention.

In each of the figures the reference characters 1 and 3 are the current electrodes by means of which a suitable current is caused to pass in the earth from the current generator 2. Detection electrodes 4 and 6 detect potentials in the area of current conduction so that the measuring instrument 5 will give indication from which information of subsurface structure is obtained.

It may be shown in theory and practice that there is one and only one configuration of generator and detector circuits wherein the inductive effect between wires is reduced to a negligible value, namely that wherein the conductor connecting the components of the generation circuit and that connecting the components of the detection circuit are mutually perpendicular. Thus, referring to the illustrations, when the conductors joining 4 and 6 are at right angles to the conductors joining the current electrodes 1 and 3, then there is no induction between the wires and the only mutual impedance is in the earth. As is well known, the term mutual impedance comprehends the measure of the ratio of the generated current to the detected potential. The variation of this measurement with respect to time or frequency constitutes a transmission characteristic of the region under observation.

As applied to the transient method, of electrical exploration the following simplification is achieved. The normal form of transient response is an exponentially rising voltage for a homogeneous earth when using previously practiced configurations of wires which are parallel. For the perpendicular configuration the response is the simple step function, and variations from this constitute indications of anomalous geological conditions.

Applied to the alternating current method, the detected potential and apparent resistivity vary with frequency in the previously used parallel configuration. When the wires are at right angles to each other, the frequency response over a homogeneous earth will be a straight line, and frequency distortion will then indicate simply and directly the presence of inhomogeneities. Transient response and frequency response as used above are different mathematical concepts of the same thing, the first being the variation with respect to frequency which is dimensionally the reciprocal of time. Thus, if the variation of mutual impedance with respect to either frequency or time is measured the information is the same.

The means and method of measuring the frequency distortion does not constitute the issue of the present invention. A novel means and method affecting such measurements constitutes the subject matter of copending application, Serial No. 172,112 filed Nov. 1, 1937.

The effects of inhomogeneities are introduced by those current filaments in the earth which lie parallel to the potential spread. Hence it is to be expected that lateral discontinuities of resistivity, or stratigraphic anomalies, will more directly affect measurements which are made with a perpendicular configuration than those made with the wires parallel or colinear as practiced in the past.

By current impulses is meant any changing current state such as single or repeated application of a wave shape such as Heaviside's unit function sometimes referred to as a step function, or such other wave shape as may be convenient, including steady state sinusoidal currents.

Figure 2:
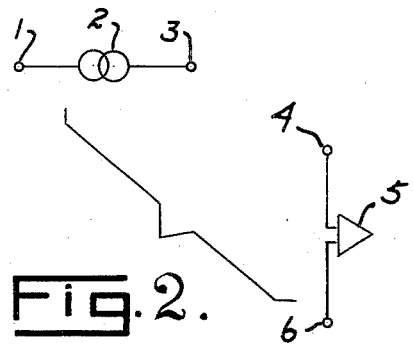
Figure 3:
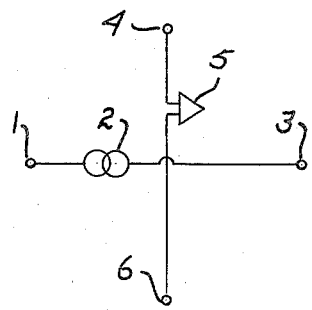
Figure 4:
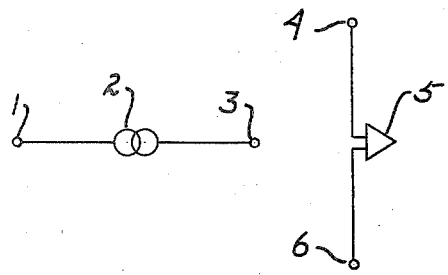

Usually, arrangements such as Fig. 1 and Fig. 2 are to be preferred over such symmetrical arrangements as Fig. 3 and Fig. 4 because the latter are capable of showing only the gradient of the electrical anomaly. When this function of the anomaly constitutes a satisfactory measure, then arrangements such as Fig. 3 and Fig. 4 would be preferable.

The invention claimed is:

1. The method of electrical prospecting which comprises arranging an electric current source and two electrodes embedded in the earth connected by substantially straight conductors, termed a primary circuit, arranging two other electrodes embedded in the earth connected by substantially straight conductors to a potential indicating instrument constituting a secondary circuit so that its array makes substantially a right angle to the array of primary circuit, causing current from the primary circuit to flow in the earth, detecting the potential produced in the secondary circuit, and observing the wave form of the detected wave.

2. The method of electrical prospecting which comprises arranging an electric current source and two electrodes embedded in the earth connected by substantially straight conductors, termed a primary circuit, arranging two other electrodes embedded in the earth connected by substantially straight conductors to a potential indicating instrument constituting a secondary circuit so that its array makes substantially a right angle to the array of primary circuit, causing current from the primary circuit to flow in the earth, detecting the potential produced in the secondary circuit, and observing transmission variation with respect to frequency between primary and secondary circuits.

3. The method of geoelectric prospecting comprising causing current impulses to flow between a pair of electrodes embedded in the earth between which the conductor completing the circuit is substantially straight, said electrodes being spaced a substantial distance apart, detecting the potential produced by the current between a second pair of electrodes spaced a substantial distance apart and between which the conductor completing the circuit is substantially straight and at right angles to the first current conductor, and measuring the variation with time of the mutual impedance between the electrode arrays.

SOLOMON BILINSKY.